J. Y. DOWNING.
WHEEL.
APPLICATION FILED MAY 15, 1914.
1,157,302.
Patented Oct. 19, 1915.
2 SHEETS—SHEET 1.
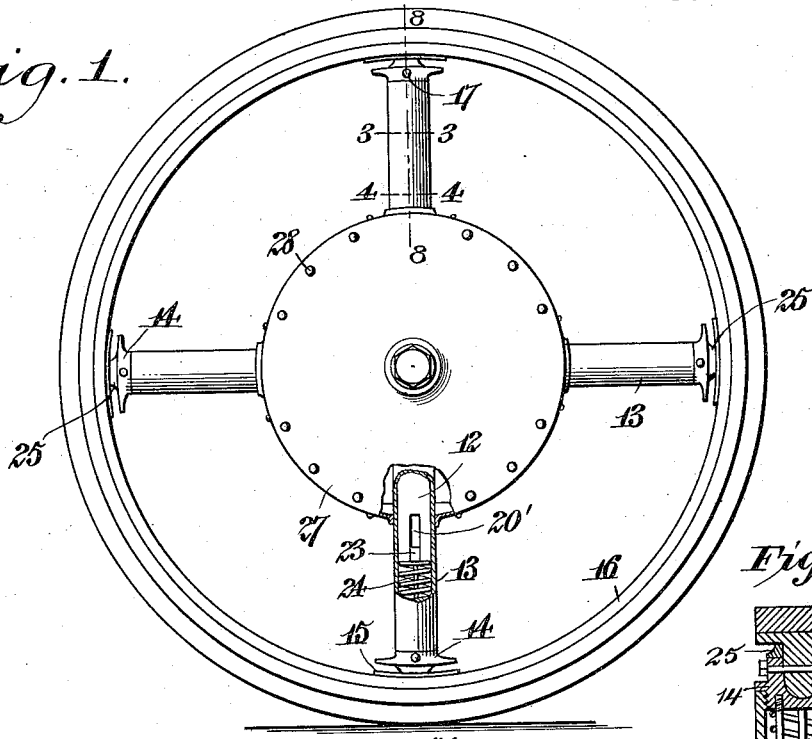
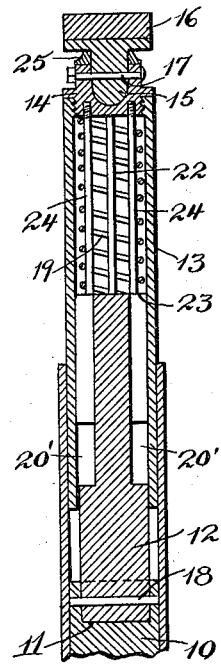
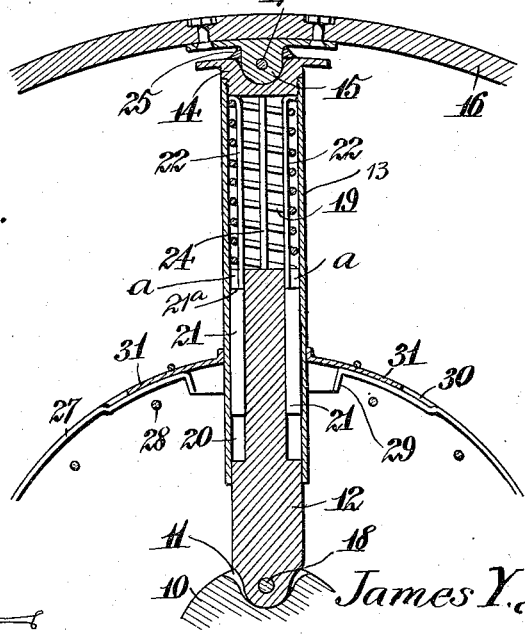
Inventor,
James Y. Downing.
By Victor J. Evans,
Attorney.
Witnesses:
Christ Feinle, Jr.

J. Y. DOWNING.
WHEEL.
APPLICATION FILED MAY 15, 1914.

1,157,302.

Patented Oct. 19, 1915.
2 SHEETS—SHEET 2.

Inventor,
James Y. Downing.
By Victor J. Evans,
Attorney.

Witnesses:

UNITED STATES PATENT OFFICE.

JAMES Y. DOWNING, OF JACKSON, MISSISSIPPI.

WHEEL.

1,157,302.  Specification of Letters Patent.  Patented Oct. 19, 1915.

Application filed May 15, 1914. Serial No. 838,889.

*To all whom it may concern:*

Be it known that I, JAMES Y. DOWNING, a citizen of the United States, residing at Jackson, in the county of Hinds and State of Mississippi, have invented new and useful Improvements in Wheels, of which the following is a specification.

The invention relates to wheels, and more particularly to the class of resilient wheels for vehicles or the like.

The primary object of the invention is the provision of a wheel of this character wherein the rim thereof is yieldably connected with the hub so that the said wheel will absorb all shocks and jars incident to its travel, thereby increasing the life of the same, as well as minimizing wear and tear on the vehicle.

Another object of the invention is the provision of a wheel of this character wherein the spokes are mounted so as to permit movement thereof when the rim or the hub are displaced, relative to each other thereby avoiding excessive strain on the spokes when the wheel is traveling over irregular ground surfaces.

A further object of the invention is the provision of a device of this character which is simple in construction, possesses the requisite resiliency to act as a shock absorber and also which is thoroughly reliable and efficient in its operation and inexpensive in manufacture.

With these and other objects in view the invention consists in the construction, combination and arrangement of parts as will be hereinafter more fully described, illustrated in the accompanying drawings, and pointed out in the claims hereunto appended.

Figure 3:
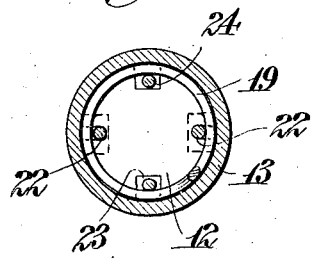
Figure 4:
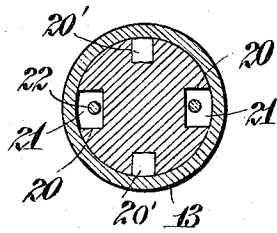
Figure 5:
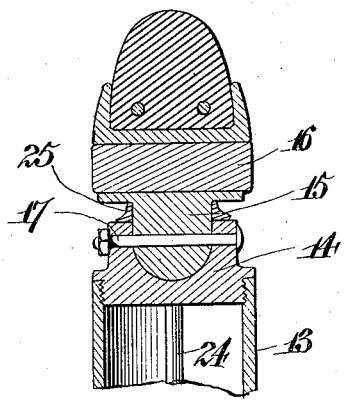
Figure 6:
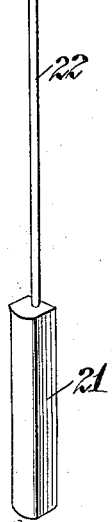
Figure 7:
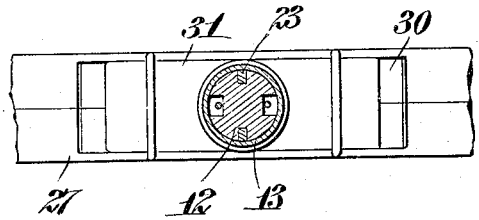

In the drawings:—Figure 1 is a side elevation, partly in section, of a wheel constructed in accordance with the invention. Fig. 2 is a fragmentary longitudinal sectional view through the wheel. Fig. 3 is a sectional view on the line 3—3 of Fig. 1. Fig. 4 is a sectional view on the line 4—4 of Fig. 1. Fig. 5 is an enlarged vertical sectional view through the pivot connection between the spoke and the rim of the wheel. Fig. 6 is a perspective view of one of the spring engaging hook members. Fig. 7 is a plan view of the dust guard adapted to be mounted on the hub. Fig. 8 is a sectional view on the line 8—8 of Fig. 1.

Similar reference characters indicate corresponding parts throughout the several views in the drawings.

Referring to the drawings in detail, the resilient wheel comprises a solid hub 10 formed in its outer periphery at predetermined intervals with recesses 11 which open through the said periphery for accommodating the inner ends of the spokes presently described.

Each spoke comprises an inner section 12 which is preferably made solid, over which telescopes an outer tubular section 13 having detachably threaded in its outer end a socket member 14 in the socket of which projects an ear member 15 suitably fastened to the inner side of a felly or rim 16 disposed concentrically with respect to the said hub. The ear member 15 is connected in the socket member 14 by means of a cross pivot 17, while the inner end of the section 12 is connected in the recess 11 by means of a pivot 18 which is passed through the said section and mounted in the hub.

Arranged within the outer tubular section 13 of each spoke is a coiled compression spring 19, while formed in the inner section 12 at diametrically opposite points are pairs of longitudinally disposed guide channels or grooves 20 and 20', respectively, the channels or grooves 20 at the outer end of the inner section 12 being contracted to form abutment shoulders *a*, while the channels or grooves 20' open through the outer end of the inner section 12, and slidably fitted in the said channels or grooves 20 are blocks 21 which are limited in their movement by the inner closed ends of the slots 20 and the outer contracted ends *a* thereof, the blocks being fitted with hook rods 22, the hook ends of which engage the outermost coil of the spring 19, while slidably fitted in the channels or grooves 20' are bars 24 which are cut away for a portion of their length to form shoulders 23 at their innermost ends, the said bars 24 being fixed in the socket member 14 at their outer ends so that the hook rods 22 and the bars 24 work in opposition to each other against the resistance of the spring 19 on the displacement of the hub or felly relative to each other of the wheel.

Now it will be seen that on the downward displacement of the hub 10 a pull will be exerted upon the inner section 12 until the blocks 21 have engaged with the abutments 22 at the outer ends of the slots 20, whence the pulling action will be resisted under the compression of the spring 19 which has its inner end resting upon the shoulders 23 of the bars 24, which are fixed to the socket member 14 connected to the felly or rim, the hook rods 22 being connected to the blocks 21 will act upon the spring 19, and by the downward thrust the latter will become compressed, thereby resisting the said thrust, and in this manner the hub is resiliently supported in the wheel. On an outward thrust of the rim or felly 16 the bars 24 through the shoulders 23 engaged with the inner end of the spring 19 will compress the same, which is held by the hook rods 22 after the blocks 21 have moved a limited distance within the slots 20 against the abutment shoulders a, so that the outward thrust of the felly or rim relative to the hub is resisted, and thus sustain the same under tension.

The guide bars 24 are passed through the springs 19 for their engagement in the grooves or channels 25, and by this particular arrangement the said sections 12 and 13 of the spokes will be sustained in true alinement with each other.

Surrounding each outer member 13 is a resilient washer 25 which is designed to close the socket member 14 to prevent the entrance of dust or dirt therein during the use of the wheel, and thus in this manner the accumulation of foreign matter within the socket for the ear member 15 is obviated.

Fixed to opposite ends of the hub 10 are disks 27, the same being suitably bolted together at 28, and are formed with inwardly tapered recesses 29 for accommodating the spokes of the wheel, and also permitting limited movement thereof in the pivots 18 which connect the spokes to the hub of the wheel. Loosely surrounding the spokes and working in suitable slots 30 formed in the outer peripheries of the disks 27 are slides 31 which close the outer open ends of the recesses 29 to prevent the entrance of dust, dirt or other foreign matter therethrough, or the accumulation of such foreign matter about the hub.

It will be apparent that the hub and rim may be moved relative to each other, and also the spokes are capable of swinging movement, and by reason of the construction of the latter the wheel will possess maximum resilient qualities for absorbing all shocks and jars incident to the travel of the wheel.

What is claimed is:—

1. A resilient wheel comprising a hub, a rim concentrically disposed with respect to said hub, ear members fixed to the inner periphery of the rim at diametrically opposite points, inner and outer sections forming spokes extending radially from the hub to the rim, the inner sections being telescoped within the outer sections, socket members threaded in the outer ends of the outer sections and receiving the ear members, pivots connecting the socket and ear members, pivots connecting the inner sections to the hub, each inner section being formed with diametrically opposed guide channels, one pair of channels opening through the outer end of the inner section, abutments closing the other pair of channels at the outer end of the inner section, blocks slidably fitted in the closed channels, hook rods connected with the blocks, a coiled compression spring mounted within each of the outer sections and engaged at one end of the hook rods, and bars fixed to the socket members and working in the open pair of channels and having abutment shoulders engageable with the inner ends of the springs.

2. A resilient wheel comprising a hub, a rim concentrically disposed with respect to said hub, ear members fixed to the inner periphery of the rim at diametrically opposite points, inner and outer sections forming spokes extending radially from the hub to the rim, the inner sections being telescoped within the outer sections, socket members threaded in the outer ends of the outer sections and receiving the ear members, pivots connecting the socket and ear members, pivots connecting the inner sections to the hub, each inner section being formed with diametrically opposed guide channels, one pair of channels opening through the outer end of the inner section, abutments closing the other pair of channels at the outer end of the inner section, blocks slidably fitted in the closed channels, hook rods connected with the blocks, a coiled compression spring mounted within each of the outer sections and engaged at one end of the hook rods, bars fixed to the socket members and working in the open pair of channels and having abutment shoulders engageable with the inner ends of the springs, and resilient washers surrounding the ear members for closing the socket members.

In testimony whereof I affix my signature in presence of two witnesses.

JAMES Y. DOWNING.

Witnesses:
A. J. LOCKE,
W. C. MOORE.

Copies of this patent may be obtained for five cents each, by addressing the "Commissioner of Patents Washington, D. C."